United States Patent

Grein et al.

[11] Patent Number: 5,252,981
[45] Date of Patent: Oct. 12, 1993

[54] FMCW RADAR SYSTEM WITH LINEAR FREQUENCY MODULATION

[75] Inventors: Nicolas Grein; Hermann Winner, both of Karlsruhe, Fed. Rep. of Germany

[73] Assignee: Robert Bosch GmbH, Stuttgart, Fed. Rep. of Germany

[21] Appl. No.: 834,403

[22] Filed: Feb. 12, 1992

[30] Foreign Application Priority Data

Feb. 16, 1991 [DE] Fed. Rep. of Germany ....... 4104792

[51] Int. Cl.$^5$ ............................................. G01S 13/34
[52] U.S. Cl. ................................................... 342/200
[58] Field of Search ................................ 342/128, 200

[56] References Cited

U.S. PATENT DOCUMENTS

| | | | |
|---|---|---|---|
| 4,590,445 | 5/1986 | Tabourier | 342/200 |
| 4,593,287 | 6/1986 | Nitardy | 343/17.5 |
| 4,968,968 | 11/1990 | Taylor | 342/174 |

FOREIGN PATENT DOCUMENTS 2710841  3/1976  Fed. Rep. of Germany .

OTHER PUBLICATIONS

N. Thrane, "The Hilbert Transform", in *Technical Review to Advance Techniques in Acoust., Elec. & Mech. Measurement*, 1984, No. 3, pp. 3-13, published by Brüel & Kjaer.

Samuel D. Stearns, *Digitale Verarbeitung analoger Signale* subtitled *Digital Signal Analysis*, pp. 61-75, 4th Edition, 1988, published by R. Oldenbourg Verlag, Vienna, Austria.

Motorola Semiconductor Technical Datasheet on DSP 56001 24-bit General Purpose Digital Signal Processor, cop. 1991.

Burr-Brown Corporation Datasheet on DAC707, DAC 708/709 Microprocessor-Compatible Digital-to-Analog Converters, 1986.

Burr-Brown IC Data Book, vol. 33, p. 9.2-107, entitled "ADC601 12-Bit 900 nanosecond Analog-to-Digital Converter".

*Primary Examiner*—T. H. Tubbesing
*Attorney, Agent, or Firm*—Frishauf, Holtz, Goodman & Woodward

[57] ABSTRACT

It has been proposed in accordance with the invention to determine the linearity of the modulated oscillator frequency of an FMCW radar by means of the Hilbert transformation and to supply a control voltage, corresponding to the deviation, to the controllable oscillator via a digital/analog converter. A control and computing unit is used to determine the linearity of the modulated oscillator frequency.

2 Claims, 4 Drawing Sheets

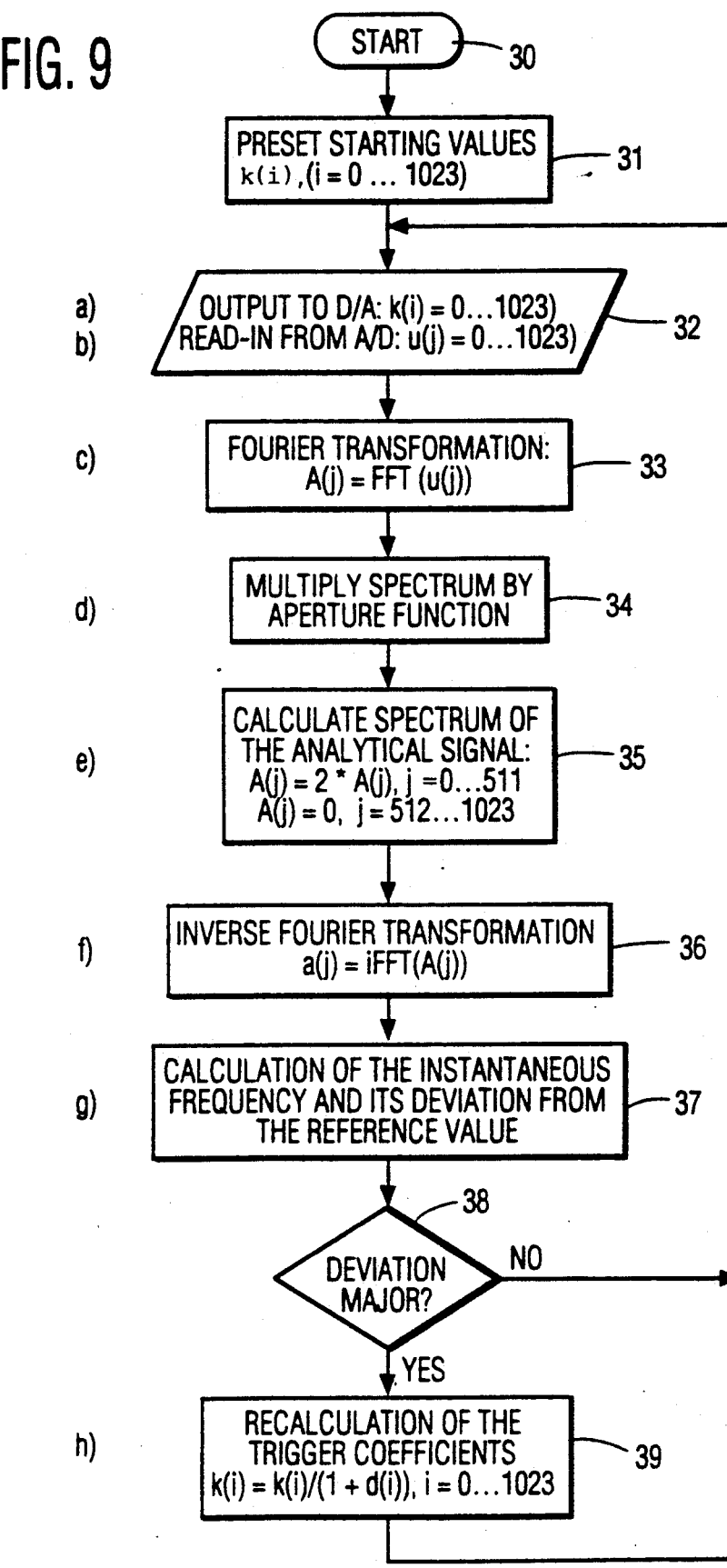

«5,252,981»

FMCW RADAR SYSTEM WITH LINEAR FREQUENCY MODULATION

FIELD OF THE INVENTION

The invention relates generally to a radar system with an extremely high frequency oscillator.

BACKGROUND

In an FMCW radar system (frequency modulated continuous wave radar) it is already known to linearize the transmitter frequency, modulated in a ramp-shape, i.e. for the duration of a ramp the frequency change is constant per unit of time. The oscillator frequency is measured in the course of this and is supplied in a closed control loop in a control circuit to a controller. As a function of a comparison between command or a reference value and an actual value, the controller forms an adjusting or setting value which is supplied to the oscillator and which follows up the latter's frequency accordingly. It has been found that the tuning elements used, for example varactor diodes, only provide unsatisfactory results because of their non-linear characteristic curves. Added to this is that external influences, such as temperature or aging, change the characteristic curve of the tuning elements. In order to obtain satisfactory results for linearity in spite of this, very complicated measures, which generate relatively high expense, are required. It is furthermore disadvantageous that, as a rule, control circuits are susceptible to oscillations, so that there is no assurance of faultless operation of the radar system.

It is also known to measure the frequency lines of the oscillator as a function of the temperature prior to the actual use of the radar system and to form correcting values therefrom, which are stored. These values are then used for correcting the measured characteristic curve of the oscillator frequency. However, to execute this method it is necessary to use an additional temperature sensor with the aid of which it is possible to detect temperature-dependent correcting values. This method requires very large expenditures, since characteristic curves must be determined for each oscillator. But the problem of susceptibility to oscillations in the control loop cannot be affected with this method.

THE INVENTION

In contrast to the above, the radar system of the invention has the advantage of not requiring a control loop for linearizing the oscillator frequency. Therefore the radar system is not susceptible to control loop oscillations. It is particularly advantageous that the radar system is insensitive to parameter variations of the oscillator used because of the pre-evaluation of the differences which have been determined. Another advantage can be seen in that temperature or aging effects are automatically evened out. Later calibration is therefore not required.

The invention has further advantages. It is particularly advantageous that the linearity of the modulated oscillator frequency can be checked in a simple way by means of the Hilbert transformation. The Hilbert transformation represents a mathematical method by means of which a function in the time domain can be transformed into an analytical function. With the aid of the analytical function, it is possible to calculate the phase of the instantaneous frequency of the signal by differentiation.

It is particularly advantageous if at least one measuring cycle is used for calculating the linearity of the modulated oscillator frequency. A first result is obtained within the shortest possible time by means of this.

Since, as a rule, the linearity of the modulated oscillator frequency does not change constantly, but for example essentially in the warm-up phase, a determination of the linearity of the modulated oscillator frequency in the form of a spot check is sufficient. Computing time is saved in an advantageous manner because of this.

If a plurality of reflection objects appear, the associated partial spectrum can be isolated in an advantageous manner by means of an aperture function and the linearity determined therefrom. Definite values for the linearity or its deviation are the result of isolating the partial spectra.

To reduce the effect of interference pulses or erroneous measurements it is particularly advantageous to determine linearity deviations of the reflection spectra by the formation of mean values.

A further advantage can be seen in storing the reference values for the linearity of the modulated oscillator frequency in a table of values. In general, access to a table of values is very quick, so that the modulated oscillator frequency can be measured with a high scanning rate. Errors are reduced by this in an advantageous manner.

Further advantages of the invention can be found in the description.

An exemplary embodiment of the invention is illustrated in the drawings and will be described in detail in the description below.

DRAWINGS

FIG. 1 is a block, diagram of the exemplary embodiment of the invention,

FIG. 2 is a diagram showing the course over time of the transmission frequency of a modulated oscillator frequency, FIG. 3 is a diagram of an idealized spectrum without linearity errors, FIG. 4 is a diagram with reflection spectra and a generating curve of the envelope of an aperture, FIG. 5 shows a detail of FIG. 4, FIG. 6 is a diagram with the calculated course of the instantaneous frequency, FIG. 7 shows deviations of the instantaneous frequency from the mean value, FIG. 8 is a diagram with the spectrum of a corrected oscillator frequency, and FIG. 9 is a flowchart showing operation of the system.

DETAILED DESCRIPTION

Figure 1:
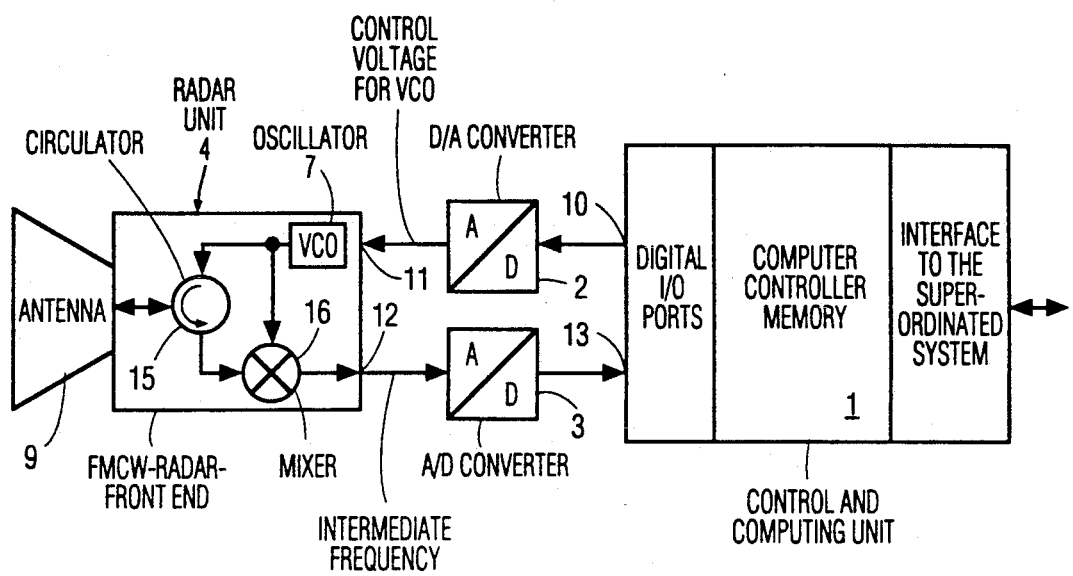

The block diagram of an FMCW radar system is shown in FIG. 1. A radar installation 4 has a voltage-controlled oscillator 7 (VCO). The oscillator 7 places a ramp-shaped modulated signal in accordance with FIG. 2 having the modulated oscillator frequency on a circulator 15, which is connected with the antenna 9. The signal is emitted by the antenna 9. The antenna 9 receives the beam reflected by an obstacle, which is conducted via the circulator 15 to a mixer 16. A portion of the oscillator energy is also decoupled from the oscillator and conducted to the mixer 16. The transmitting frequency is then mixed in the mixer to a lower frequency, the intermediate frequency. The lowered signal is available at the output 12 as the voltage signal. The output 12 is connected with the input of an analog/digital converter 3. The analog/digital converter 3 quantizes the signal and provides it to an input 13 of the control and computing unit 1. The control and computing unit 1 comprises a microcomputer, an input and an output port, a memory and a control program in accordance with FIG. 9. The microcomputer system per se is known and therefore need not be described in detail. The control and computing unit furthermore has an interface to which a superordinated or supervisory computer system can be connected.

The output 10 of the control and computing unit 1 is connected with the input of a digital/analog converter 2 which converts the digitized values into analog values. The analog output is connected with an input 11 of the radar installation 4. The output signal of the digital/analog converter 2 acts on the control input of the oscillator (VCO) 7.

The analog/digital converter 3 as well as the digital/analog converter 2 are known components which need not be described in detail. The radar installation 4 per se is also known.

The mode of operation of the exemplary embodiment will be described below:

For reasons of measuring accuracy it is required in an FMCW radar system (frequency modulated continuous wave radar) to change the ramp-shaped modulated transmitting frequency (FIG. 2) linearly, i.e. for the length of a ramp the frequency change per unit of time is constant (df/dt=k=constant).

Figure 2:
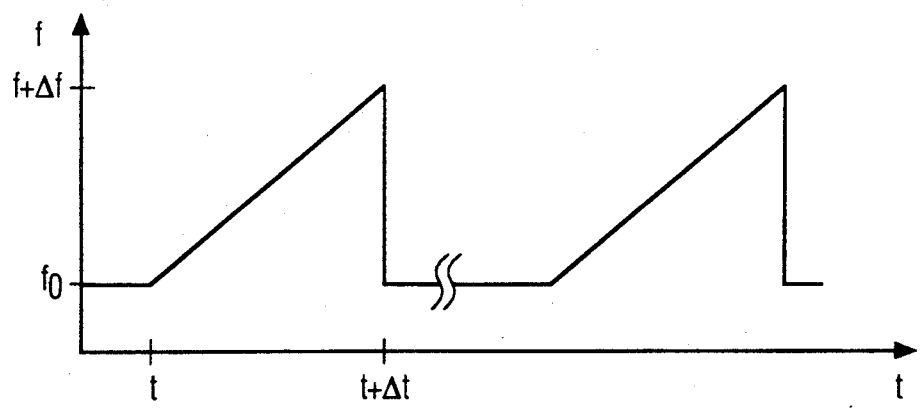

A typical ramp-shaped modulated oscillator frequency is illustrated in FIG. 2. If such a signal is reflected by an object at a distance d and received again after a time delay Td=d/2c, where c is the speed of light, and mixed with the transmitted signal, the product of mixing is a frequency $$f = k^* T_d = k^* d/2c \quad T_d \text{ time delay, } k \text{ frequency change per unit of time} \quad c \text{ speed of light}$$

which is proportional to the distance d. The output signal of such a radar unit contains frequency portions for each registered reflected object, from which the respective distance can be calculated. However, in this consideration frequency displacements on account of the Doppler effect are being neglected. Linear modulation of the oscillator frequency is necessary because of the generally required great accuracy of the distance determination as well as for discrimination between a plurality of adjacent objects.

The signal received by the radar unit 4 and reflected by at least one object is provided to an analog/digital converter 3 and is digitized by it. The digitized signal reaches the control and computing unit 1 via the input 13. By means of the Hilbert transformation the control and computing unit 1 now determines the deviation of the measured modulated oscillator frequency from a linearized reference value and can, if required, store these deviations A signal is generated in accordance with the deviation from the reference values for linearity and is supplied to a digital/analog converter 2 via an output 10. This signal, in the form of an analog signal, is supplied to the controllable oscillator 7, which changes the oscillator frequency in accordance with the preset reference values, so that it is now possible to beam a linearly modulated oscillator signal via the antenna 9. The reference vales for correcting the linearity of the oscillator frequency are stored in a memory of the control and computing unit 1, so that the reference values are available in the form of a table of values.

In a further embodiment of the invention it is provided to preset the reference values for the frequency increase by means of a linear equation.

The determination of the deviation, from linearity, of the modulated oscillator frequency can be performed in a particularly advantageous manner with the aid of the Hilbert transformation (see, for example, N. Thrane, "The Hilbert Transform", in *Technical Review* 3/1984, Bruel & Kjaer), which will be briefly described below:

The Hilbert transform of a real time signal $\tilde{a}(t)$ is defined by the following equation:

$$H[a(t)] = \tilde{a}(t) = \frac{1}{\mu} \cdot \int_{-\infty}^{\infty} a(\tau) \frac{1}{t - \tau} d\tau \quad (1)$$

having $\tilde{a}(t)$ as the transform.

The transformation changes the time signal $a(t)$ into another time signal $\tilde{a}(t)$. The equation (1) corresponds to a convolution in the time domain. Using the convolution theorem, $$a(t)^*b(t) = \int_{-\infty}^{\infty} a(\tau)b(t - \tau)d\tau \quad (2)$$

$$a(t)^*b(t) \xleftrightarrow{F} A(f) \cdot B(f) \quad (3)$$

$$a(t) \cdot b(t) \xleftrightarrow{F} A(f)^*B(f) \quad (4)$$

where * is the convolution operator and F the Fourier transformation, the equation (1) can also be shown as follows:

$$H[a(t)] = \tilde{a}(t) = \frac{1}{\mu} a(t) * \frac{1}{t} \quad (5)$$

With the correspondence $$F\left[\frac{1}{i \cdot \mu \cdot t}\right] = \text{sgn } f \quad (6)$$

the Fourier transform of $H[a(t)]$ is obtained $$F[\tilde{a}(t)] = A\perp(f) = A(f) \cdot (-i^*\text{sgn } f) \quad (7)$$

The Hilbert transformation of a time function $a(t)$ thus can be made by transforming $a(t)$ in accordance with Fourier, multiplying the spectrum by i times sng(f) and re-transforming the result back into the time domain.

A so-called analytical signal can be generated from a time signal $a(t)$ with the aid of the Hilbert transformation, which is defined as follows:

$$\overset{\bullet}{a}(t) = a(t) + i \cdot \tilde{a}(t) \quad (8)$$

Because this is a complex signal, it can also be transferred into the polar projection with the phase $\phi(t)$ and the value $|\overset{\bullet}{a}(t)|$:

$$\tilde{a}(t) = |\tilde{a}(t)| e^{i \cdot \phi(t)} \quad (9)$$

where $$|\tilde{a}(t)| = \sqrt{a(t)^2 + a_\perp(t)^2} \quad (10)$$

and $$\phi(t) = \arctan\left[\frac{a_\perp(t)}{a(t)}\right] \quad (11)$$

The particular advantage of the analytical signal $\tilde{a}(t)$ over the original, purely real time signal $a(t)$ in connection with the present method is the opportunity of calculating the instantaneous frequency of the signal by differentiating the phase:

$$f(t) = \frac{1}{2\pi} \cdot \frac{d}{dt} \phi(t) \quad (12)$$

Finally, with the equations (7) and (9) and the general mathematical rules of the Fourier transformation, the Fourier transform of the analytical signal can be written as $$A(f) = A(f) + iA_\perp(f) = A(f)(1 + \operatorname{sgn} f) = \begin{cases} 0, & \text{for } f < 0 \\ A(f), & \text{for } f = 0 \\ 2A(f), & \text{for } f > 0 \end{cases} \quad (13)$$

The basics shown here for the transformation of continuous time signals can be transferred without changes of their content to the discrete transformation of number sequences of scanned signals. Regarding the relevant methods and marginal conditions, reference is made to the literature in which this theme is extensively treated (for example, Stearns, Digitale Verarbeitung analoger Signale [Digital Processing of Analog Signals]).

Figure 3:
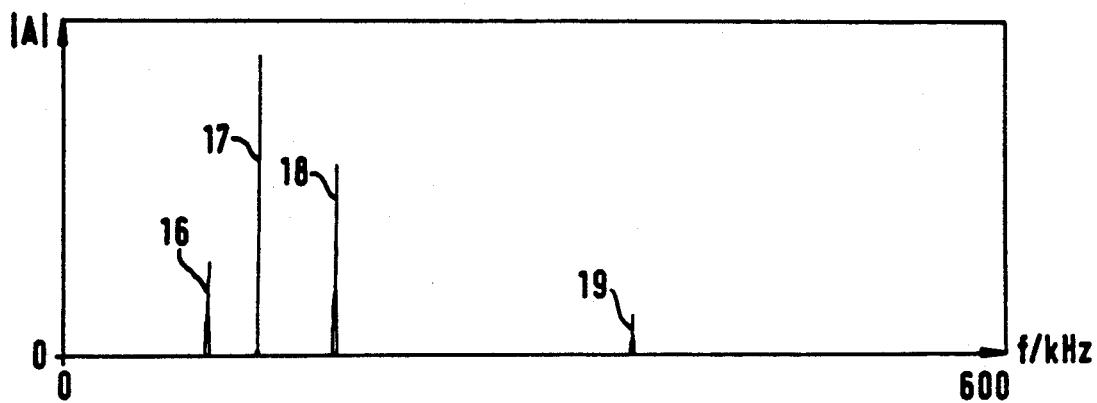
Figure 4:
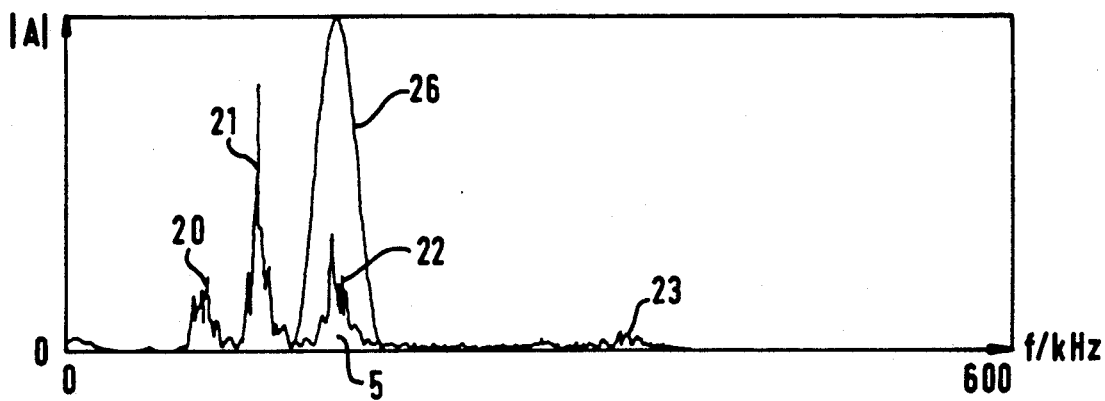

It is possible to describe the method for linearization of the frequency modulation on the basis of these facts in the following manner:

The starting point for a measuring cycle is a set of m numerical values k(i), i=0 . .. m-1, by means of which the trigger function for the oscillator of the radar unit is described. The control unit sends these values to the D/A converter and in this way controls the modulation of the transmitting frequency. The values k(i) are estimated values for the ideal trigger function which would lead to a frequency-linear modulation of the transmitting frequency (oscillator frequency). The aim of the following steps is the calculation of a new set of values k(i) which would come as close as possible to this ideal trigger function.

a. The control unit, with the aid of the D/A converter, generates the trigger function for the radar unit.

b. Simultaneously with step a., the voltage signal which is returned by the radar unit is scanned, quantized by the A/D converter and stored in the computing unit. A set of n scanning values a(j) is obtained.

c. An FFT (fast Fourier transform) is performed with the scanning values from b. A spectrum consisting of n complex numbers and containing the frequency and phase information of the signal is obtained. FIG. 3 shows four idealized portions 16 to 19 of amplitude spectra with completely linear modulation when four reflectors are present. Each reflection object is represented by a small amplitude peak at a frequency which depends on the distance of the reflecting object. But with non-ideal modulation the frequencies contained in the signal of the radar unit are not constant in time, so that they provide a portion to a plurality of frequency lines of the spectrum. This results in broadening of the expected amplitude peak, such as is shown in FIG. 4 for the four partial spectra 20 to 23.

d. The partial spectrum 22 (FIG. 4) is enveloped by an aperture function 26 in such a way that the frequency lines of exactly one reflecting object are maintained when the aperture function is multiplied with the entire spectrum, but the frequency lines of other reflecting objects and interferences are suppressed. Hanning or Hamming apertures, for example, are suitable as aperture functions (see Stearns, Digitale Verarbeitung analoger Signale [Digital Processing of Analog Signals]).

Figure 5:
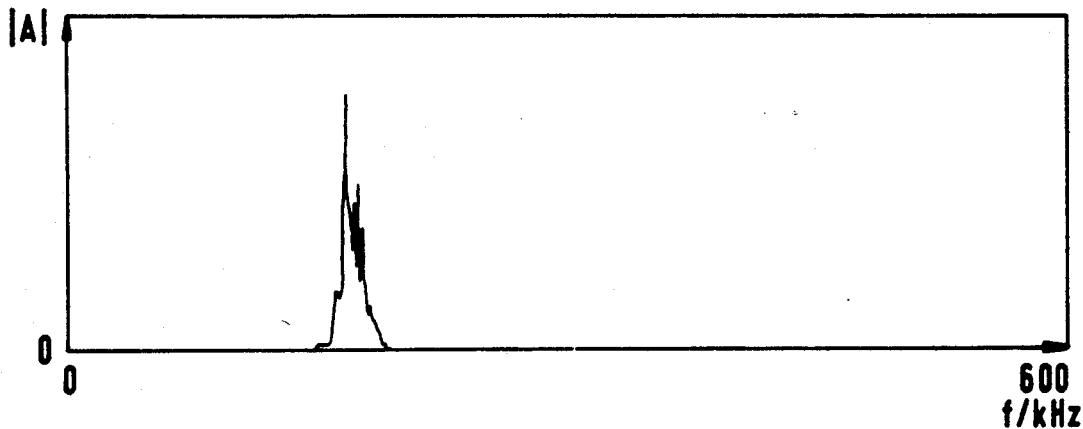
Figure 6:
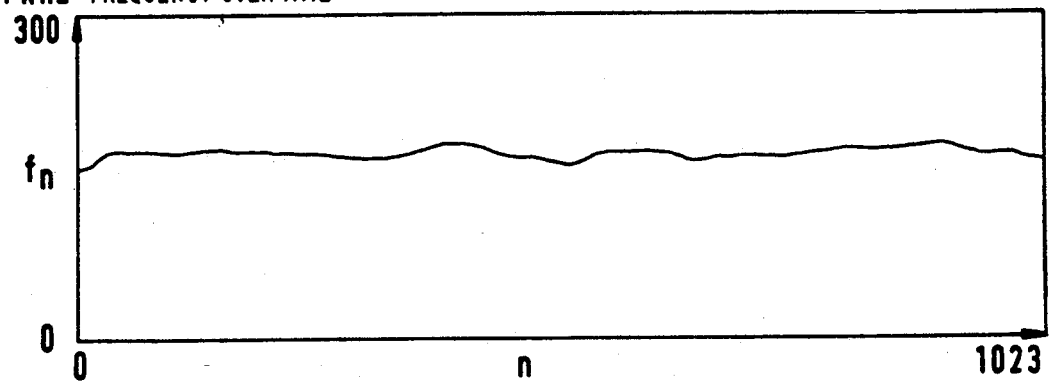
Figure 7:
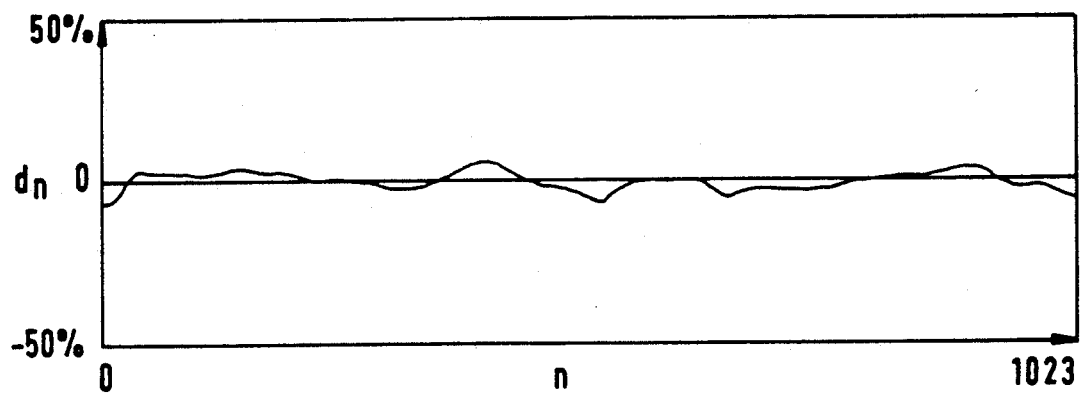

FIG. 5 shows the result of step d. applied to the total spectrum.

e. In accordance with Equation (13), the values of the spectrum for negative values are set to zero and the values of positive frequencies are multiplied by a factor of two. In this way the Fourier transform of the analytical signal is obtained.

f. An inverse FFT is performed with the modified spectrum from e. The result is an analytical time signal in accordance with Equation (8) in the form of a complex scanning value a(j).

g. Analogously to Equations (11) and (12), the instantaneous frequency of the analytical signal is determined in accordance with the equation:

$$f(j) = \frac{\phi(j) - \phi(j-1)}{2\pi \cdot T} \quad (14)$$

where T is the scanning period. Because of the $\pi 2$-periodicity of the phase function $\phi$, as a correction it is necessary in case of a phase jump between $\phi(j-1)$ and $\phi(j)$, which in accordance with Equation (14) might lead to a negative frequency, to add $\pi 2$ to the numerator. If the results are standardized by dividing all f(j) by the mean value of all f(j) and subtracting one, the relative deviation d(j) of the instantaneous frequency from its mean value is obtained (FIG. 7).

h. Now the coefficients k(i) of the trigger function can be modified in such a way that the deviations d(j) are counteracted. The calculation rule for this depends, among others, on the characteristic of the D/A converter and the ratio of the clock rates of the D/A and the A/D converters. In case both clock rates are the same and if the D/A converter has integrator characteristics, i.e. its output signal is raised or lowered by a value u(i)~k(i) with each new k(i), a possible calculation rule by way of example would be:

knew(i)=k(i)/(1+d(i)), i=.. n−1

The new trigger coefficients knew(i) are used as k(i) in the next step a.

In accordance with the actual purpose of the radar system, the steps a. to c. are continuously performed cyclically as a rule. The quality of the trigger function in respect to linearity can be checked by means of steps d. to g. either as often as a. to c. or only in the form of spot checks. If the deviation from linearity calculated in step g. exceeds a preset maximum value, a correction of the coefficients of the trigger function can be performed with step h.

Figure 8:
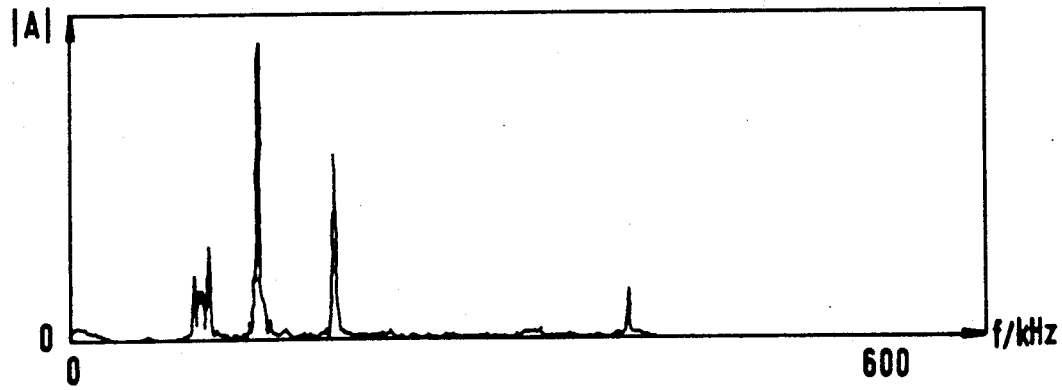

An example of frequency linearity is illustrated in FIG. 8.

The following advantageous steps are provided in a further embodiment of the invention.

If a plurality of reflecting objects are registered during a measurement, the associated partial spectra, provided they do not overlap, can be individually isolated with an aperture function in accordance with step d. and further processed separately in accordance with steps e. to g. Accordingly, a plurality of results for the linear deviation is received, which can be averaged to reduce statistical measuring uncertainties.

Also to reduce statistical measuring incertainties, it is possible to produce average values from an arbitrary number of previous measurements and calculations between steps g. and h.

A flow diagram is shown in FIG. 9 which is suitable for controlling the control and computing unit 1 in accordance with steps a. to h. Following starting in Position 30, starting values for k(i) are set in Position 31, where i takes on the values 0 to 1023. In accordance with steps a. and b., the values k(i) for i=0 to 1032 are issued to the digital/analog converter 2 in Position 32. The values u(j) for j=0 to 1023 are also read in by the analog/digital converter 3. In Position 33 the Fourier transformation A(j)=FFT(u(j)) for step c. is performed. In accordance with FIG. 4, the partial spectrum 22 is isolated in Position 34 by multiplication with the aperture function 26 (step d.). The spectrum of the analytic signal is calculated in Position 35 in accordance with step e.:

$$A(j)=2^* A(j), j=0 \text{ to } 511 \text{ and } A(j)=0, j=512 \text{ to } 1023.$$

In Position 36 the inverse Fourier transformation A(j)=iFFT(A(J)) is formed in accordance with step f.

In Position 37 (step g.) the instantaneous frequency is calculated in accordance with Equation (14) and its deviation d(j) from the reference value is determined.

In Position 38 an interrogation is performed to see whether the deviation d(j) from the reference value is major. If this is not the case, the program again starts at Position 32. However, if the deviation is major, a new calculation of the trigger coefficient takes place in Position 39 in accordance with step h.:

$$k(i)=k(i)/(1+d(i)), i=0 \text{ to } 1023.$$

After that the program again starts in Position 32.

Various changes and modifications may be made, and features described in connection with any one of the embodiments may be used with any of the others, within the scope of the inventive concept.

In an exemplary embodiment of the invention, the following parts are used.

A microcomputer 1 is model DSP 56001 made by Motorola.
A D/A converter 2 is model DA C 708 made by Burr-Brown.
A A/D converter 3 is model ADC 601 made by Burr-Brown.
A radar unit 4 is model FMCW-Radar made by Plessey.

-continued

A VCO 7 is gunn-oszillator with varactor diode (cavity resonator)
A circulator 15 ⎫
A mixer 16     ⎬ are standard parts for use in FMCW radar.

We claim:
1. A frequency-modulated continuous-wave (FMCW) radar system, having
a radar unit (4) with a millimeter-wave voltage controlled oscillator (7) (VCO) adapted to generate a periodically ramp-shaped, linearly modulated oscillator frequency output signal;
said oscillator (7) having an input, defining an input of said radar unit (4), and an output connected to an antenna (9);
circulator means (15) connected between said oscillator (7) and said antenna (9), said circulator means (15) also receiving any radar signal reflected back from a reflecting object;
mixing means (16), having inputs connected respectively to outputs of said oscillator (7) and of said circulator means (15), for mixing said oscillator signal and said reflected signal to obtain a lower-frequency signal;
means (3), connected to an output of said mixing means, for sampling and digitizing said lower-frequency signal; and
computing means (1), having an input(13) connected to an output of said sampling and digitizing means (3), for applying a control signal to an input (11) of said oscillator (7) in order to assure linearity of ramp portions of said linearly-modulated output signal;
said computer means comprising means for detecting any deviation from linearity appearing in said output signal of said sampling and digitizing means (3), and generating a series of corresponding correction signals by
generating a set of n sampling values a (j), where n is an integer and j represents a value of the output signal from said sampling and digitizing means (3);
performing a Hilbert transform on said set to obtain a set of n calculated values a'(j) which represent instantaneous frequency values of said lower-frequency signal;
obtaining a set of n further calculated values of the form

$$O(j)=\arctan(a'(j)/a(j));$$

obtaining an average value of said set of further calculated values; and
obtaining a difference values, each representing the difference between said average value and a respective one of said further calculated values, said difference values defining instantaneous correction signals to be applied to said voltage-controlled oscillator (7); and
further comprising
means (2) for applying each correction signal, as an analog control voltage, to said oscillator (7).
2. A radar system according to claim 1 wherein said applying means (2) comprises a digital-to-analog converter (DAC) coupled to an output of said computing means.

* * * * *